Sept. 26, 1961 W. C. JOHNSON 3,001,898
WELDING WITH WASHING EFFECT
Filed Nov. 14, 1958

INVENTOR
Wallace C. Johnson
BY
ATTORNEYS 3,001,898
WELDING WITH WASHING EFFECT
Wallace C. Johnson, Hamden, Conn., assignor to Arcos Corporation, Philadelphia, Pa., a corporation of Pennsylvania
Filed Nov. 14, 1958, Ser. No. 774,001
5 Claims. (Cl. 148—23)

The present invention relates to submerged arc welding, and particularly to submerged arc welding in deep narrow grooves.

The present application is a continuation-in-part of my copending application Serial No. 528,049, filed August 12, 1955, now abandoned, for Welding With Washing Effect.

A purpose of the invention is to facilitate the removal of slag (the fused portion of a covering flux) from successive beads in submerged arc welding.

A further purpose is to avoid the need of dual-pass or split-bead welding in each layer of submerged arc welding.

A further purpose is to permit the use of narrower grooves in submerged arc butt welding without inconvenience in removal of slag, thus using less weld metal.

A further purpose is to weld in less time due to the smaller requirement for weld metal.

A further purpose is to obtain a washing effect or concave surface of the welding bead which facilitates slag removal from a submerged arc weld.

A further purpose is to incorporate from 5 to 91 percent and preferably from 50 to 90 percent of anhydrous fibrous calcium silicate such as wollastonite in the flux, the basic particle size of the wollastonite being in excess of 200 mesh, and the flux being used in free flowing bonded particles.

A further purpose is to bond flux ingredients to obtain a particle size through 10 and on 80 mesh per linear inch of screen.

A further purpose is to develop the bond in a flux containing anhydrous fibrous calcium silicate such as wollastonite and containing from 9 to 13 percent of sodium silicate on the weight of the dry ingredients, and preferably from 9.7 to 12.1 percent of sodium silicate on the weight of the dry ingredients, by baking the flux in the temperature range between 400 and 1150 degrees F. and preferably between 800 and 900 degrees F., thus forming bonded particles without harming the desirable properties of the fibrous calcium silicate by fusion.

Further purposes appear in the specification and in the claims.

Figure 1:
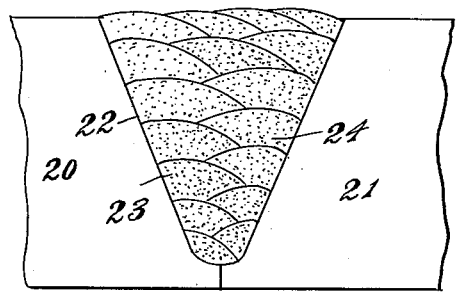
Figure 2:
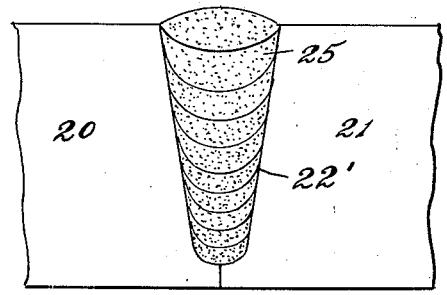

The drawings are transverse sections of welds useful in explaining the invention, FIGURE 1 being a weld using split passes and FIGURE 2 a weld using only one pass to each layer.

In normal practice of submerged arc welding particularly of carbon and alloy steel parts, and especially using deep narrow grooves, considerable difficulty occurs in slag removal. This difficulty has been accentuated by the fact that the weld bead as normally produced is convex, leaving reentrant edges, called undercutting, adjoining the sides of the groove where slag removal is particularly difficult, caused by the slag clinging in the sharp corner so formed.

To facilitate slag removal therefore the welding engineer has adopted the expedient of designing with wider grooves, especially where the grooves are deep, so pneumatic tools can be worked in deep grooves, and as a result a considerably increased weight of weld metal must be deposited in order to fill the wider joints. Furthermore, the practice has been adopted of using split-beads or dual-passes, one of which is deposited in the groove against one side without touching the opposite side, and the other of which is then deposited against the opposite side of the groove to join the bead first mentioned. This practice doubles the number of separate weld beads required.

The slag of the present invention is a fully nonexothermic slag which is utilized in submerged arc welding.

I have discovered that by controlling the composition and weight of the welding flux, it is possible to cause the weld bead to climb the groove on each side, producing a clean and effective washing action, and depositing a concave bead which is free from reentrant edges and less apt to undercut. Thus the slag can be much more readily removed than in the prior practice.

Furthermore, since the slag removal is easy, the need for split weld beads in wider joints is eliminated and the number of passes is accordingly reduced. It should be noted that present practice often requires more time to remove the slag for the next pass than to do the actual welding.

A further advantage of the invention is that I find that the width of the weld groove can be reduced about 30 percent over that commonly employed without increasing the difficulty of removing the slag. In addition to saving time, this decreases the distortion from heavy welding.

In accordance with the invention, I employ a welding flux which inherently imparts to the weld bead a concave surface, and promotes washing and climbing of the weld bead on both sides of the groove. To secure this effect I use from 5 to 91 percent by weight of anhydrous fibrous calcium silicate such as wollastonite in the flux. The wollastonite should not have a particle size below 200 mesh per linear inch in order to secure the effect, as I do not wish to destroy its fibrous character. It should of course be unfused.

Wollastonite is a native calcium metasilicate of fibrous character, and when finely divided it retains its fibrous character down to a particle size of 200 mesh per linear inch. It consists of about 46 percent of CaO and 49 percent of $SiO_2$ by weight.

Instead of wollastonite, any nonhydrous fibrous calcium silicate may be used. For example lime and silica may be fused and blown after the manner of making slag wool. Asbestos is not desirable as it is hydrous and gives off sulphur compounds.

One of the very important advantages of the present invention is that it makes possible producing an agglomerate whose particles are in spherical form by binding together the anhydrous fibrous calcium silicate with their submerged arc welding ingredients and with sodium silicate in water solution, drying the flux at a proper temperature to develop the bond without fusion of any element, and producing ultimate flux particles of a size range through 10 mesh and on 80 mesh per linear inch.

The other ingredients will desirably be normal submerged arc flux ingredients, one desirable ingredient being ground limestone in the proportion of 5 to 25 percent and preferably about 15 percent by weight. Another desirable ingredient is ground calcium fluoride in the proportion of 5 to 15 percent and preferably about 10 percent by weight. Another desirable ingredient is ground cryolite in the proportion of 2 to 12 percent by weight. Zirconium silicates from 5 to 40 percent by weight may also be used. Alloying metals such as ferroalloys will in many cases be desirably employed, a typical example being 2 to 8 percent of ferroalloys, for instance 2 percent of ferromanganese and 2 percent of ferrosilicon, as well as 3 percent of ferrochrome by weight. In some cases I use substantially pure metals for alloying, such as 1.5 percent electrolytic manganese and 2.5 percent of metallic chromium.

None of the ingredients used is larger than 10 mesh per linear inch.

The proportion of sodium silicate (used as sodium silicate water solution) on the dry weight of the ingredients will be between 9 and 13 percent by weight, and this wide range is particularly desirable where dry extrusion or pressing of soft paste is used as the method of manufacture. Where the method of manufacture is hand or machine screening, the sodium silicate content on the dry weight of the flux will desirably range between 9.7 and 12.1 percent, and most desirably between 11.1 and 11.5 percent (the sodium silicate is used as water solution).

The sodium silicate is desirably used in a water solution having a strength between 27 and 54 percent sodium silicate by weight and preferably between 35 and 45 percent sodium silicate by weight. It will be evident that when I refer to sodium silicate I recognize, of course, that potassium silicate may be used instead of sodium silicate. The ratio of Na₂O:SiO₂ in the sodium silicate may range between 1 to 3.75 and 1 to 1.60 and preferably between 1 to 3.22 and 1 to 2.90.

The drying to develop the bond and form the agglomerate without fusing the anhydrous fibrous calcium silicate is carried out at a temperature in the range between 400 and 1150 degrees F., preferably between 600 and 1000 degrees F. and most desirably between 800 and 900 degrees F. for a time of at least about five hours.

The resulting product has a density of 0.95 gram per cubic centimeter. Conventional fluxes are much heavier. Submerged arc weld beads were made with this flux using both rimmed steel or killed steel wire of plain carbon with good results. Also submerged arc weld beads were made with this flux using stainless steel analyses with good results.

The following are examples of different fluxes including the wollastonite as above discussed.

| Test Number | Percentages by weight | | | | | | | |
|---|---|---|---|---|---|---|---|---|
| | 8561 | 8727 | 8562 | 8463 | 8555 | 8955 | 8733 | 8563 |
| Wollastonite | 98 | 86 | 83 | 77.5 | 65 | 73 | 73 | 73 |
| Bentonite | 2 | 2 | 2 | 2.5 | 2 | 2 | 2 | 2 |
| Ferromanganese | | 2 | | | | | | |
| Limestone | | 10 | 15 | | 33 | 10 | 10 | |
| Dolomite | | | | 20 | | | | |
| Cryolite | | | | | | 12 | | |
| Ca-Mn-Si-Fe Alloy ¹ | | | | | | 1.5 | | |
| Aluminum | | | | | | 1.5 | | |
| Rutile | | | | | | | 10 | |
| Fluorspar | | | | | | | 5 | |
| Alumina | | | | | | | | 25 |
| | 100 | 100 | 100 | 100 | 100 | 100 | 100 | 100 |
| Sodium Silicate. 47° Baumé | 44 | 33 | 37 | 33 | 43 | 28 | 31 | 34 |
| Baking Temperature, ° F. max. | 650 | 840 | 650 | 840 | 840 | 840 | 840 | 650 |
| Welding Tests with 18/8 wire | good | | good | good | fair | | fair | good |
| CrMo wire | good | fair | good | good | fair | good | good | fair |

¹ Composition of Ca-Mn-Si-Fe alloy is Ca 17.0–19.0, Mn 8.0–10.0, Si 55–60, Fe 10–14 percent by weight.

Two 1½ inch mild steel plates were machined to form a thirty degree weld groove plus one-quarter inch root, and placed in position for welding. Four passes were made with the killed steel wire and two passes were made with rimmed steel wire using the flux above referred to, and very good wall washing and concavity was obtained in all passes without using any split passes. The last pass was made with 720 amperes A.C. to 11 inches per minute, while 600 amperes at 18 inches per minute was used on the previous passes.

A good arc action was obtained with this flux without any flashing even on the last pass with 1¼ inch burden of flux.

One of the advantages of the invention is that it is possible to use limestone as a flux ingredient and retain it in the form of calcium carbonate until such time as it is actually used in the weld. A suitable composition is composed of 5 to 51 percent of anhydrous fibrous calcium silicate having a basic particle size in excess of 200 mesh per linear inch, 2 to 40 percent of limestone powder, and 9 to 13 percent of sodium silicate calculated as dry weight disregarding the water in which it is initially dissolved. The baking temperature in this case should not exceed 1150 degrees F., so that the limestone is not converted to calcium oxide. If desired other submerged arc welding flux ingredients may be used, such as 2 to 10 percent of alloying metals and 2 to 12 percent of calcium fluoride.

In one desirable form of the flux of the invention, I will include 1 to 15 percent by weight of metallic deoxidizer such as aluminum, magnesium, silicon, manganese or chromium in powdered form. In the case particularly of silicon, manganese and chromium, these may be used as ferroalloys. The deoxidizer will where desired be employed with other arc welding flux ingredients such as 2 to 10 percent by weight of alloying metals and 2 to 12 percent by weight of calcium fluoride.

By keeping the baking temperature at a level which does not exceed 1150 degrees F., the damage to the flux by melting or oxidizing the metallic deoxidizer is avoided.

FIGURE 1 shows steel weld members 20 and 21 forming a wide weld groove 22 as in the prior art, filled by split bead passes 23 and 24.

FIGURE 2 shows the same job using a narrow weld groove 22', with one-pass steel deposits 25 filling the groove in ten layers.

Efforts have been made by experimental work to determine the theory on which the improved fluxing action operates and the following discussion of the theory is given without prejudice and without predicating the invention on the validity of the theory.

The possibility was considered that the gas evolution might be responsible and accordingly welds were conducted which eliminated the limestone content entirely.

Good concave weld beads were obtained washing both walls, thus indicating that the evolution of carbon dioxide, which did not occur in this case, was not a factor. Furthermore, welds under similar conditions were produced with competitive fluxes which do not evolve carbon dioxide and it was found that convex beads without washing either wall resulted. Welds were then made using alternate beads of the flux of the composition of the present invention, omitting the limestone, and a competitive flux containing no limestone, and it was found that the beads were concave and wall washing with the flux of the present invention and convex without wall washing on either side when the competitive flux was used.

The possible theory was advanced that wetting action was the critical characteristic, and accordingly from a flux consisting of wollastonite, limestone, and 12 percent of cryolite which exhibited the characteristic behavior of the present invention, the cryolite (a strong fluxing ingredient) was omitted and limestone was employed instead. The wall washing effect was obtained as before. Then successive beads were applied using a competitive flux, which gave convex beads without any washing of the side walls. It was therefore considered that wetting action was not the critical factor.

Consideration was then given to the possibility that the lightness of weight of the flux of the invention, alone or combined with the bridging action which occurs in the presence of the arc due to the fibrous character and the interlocking of the fibers, thus supporting the weight of the unfused flux against the side walls of the groove, might be responsible for the effect.

Actually the density of the flux of the invention is about 50 percent of the density of competitive fluxes.

A flux was made consisting of the ingredients such as limestone and fluorspar and the ferroalloys minus the wollastonite. This flux, whose density was greater and which lacked the fibrous nature, produced convex beads without the wall washing effect.

As a further check, fused flux obtained from previous welds according to the invention was crushed and screened to a particle size through 14 and on 80 mesh per linear inch and this recrushed flux was employed in making submerged arc welds. It was of course heavy (about 1.84 gms. per cubic centimeter) since the wollastonite had lost its low density and fibrous structure by melting. Here again the weld beads were convex and there was no indication of wall washing on either side. It therefore appears evident that the presence of the fibrous structure of the wollastonite which makes the flux so light is very critical, since it has already been seen from previous experiments that without this feature the same flux will not form concave beads.

Three fluxes were then made up conforming to the flux first mentioned except that in flux A the wollastonite had been ground so fine (below 200 mesh per linear inch) that it had lost its fibrous character, while in flux B the fibers were of moderate length and in flux C the larger fibers remained up to 50 mesh per linear inch. A single weld was set up having flux A in one zone, flux B in another zone, and flux C in another zone, and the arc was carried continuously through all three zones. The continuous weld was made using 5/32 inch bare mild steel wire, with 500 amperes A.C. at 35 to 40 volts and a speed of 18 inches per minute.

In the zone produced by flux A the weld was convex without wall washing and in the zones produced by fluxes B and C where fibrous wollastonite was present, the weld bead was concave with desirable washing of both walls in a single pass. It is interesting to note that the density of flux A was 1.27 grams per cubic centimeter, the density of flux B was 1.01 grams per cubic centimeter, and the density of flux C was 0.95 gram per cubic centimeter.

In a commercial welding establishment, welding two inch thick plates, the width of the gap was reduced by over 30 percent when using the flux of the invention. It was found that a concave bead occurred on each pass with good washing of the side walls, and the slag removal was easy. No split passes were used.

In view of my invention and disclosure, variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claims.

Having thus described my invention, what I claim as new and desire to secure by Letters Patent is:

1. A flux composition free of constituents having exothermic reactivity with respect to each other, said flux composition adapted to be introduced for submerged arc welding and consisting of agglomerated particles which consist essentially of, 50 to 90% of wollastonite having a basic particle size in excess of 200 mesh per linear inch and being in the form of native calcium silicate of fibrous character free from conversion by heat or chemical change, 2 to 40% of limestone, and of 9 to 13% of sodium silicate calculated as dry weight disregarding the water in which it is initially dissolved, the sodium silicate being baked at a temperature of 600 to 1000° F. in contact with the wollastonite and limestone, and the agglomerated particles themselves having a particle size between 10 and 80 mesh per linear inch and having the fibrous wollastonite therein unfused and the limestone retained as calcium carbonate.

2. A flux of claim 1, in which the quantity of limestone in the agglomerated particles is between 5 and 25%, said agglomerated particles also containing 2 to 12% of cryolite.

3. A flux of claim 1, in which the agglomerated particles also contain from 5 to 15% of calcium fluoride.

4. A flux of claim 3, in which the agglomerated particles also contain from 5 to 40% of zirconium silicate.

5. A flux of claim 3, in which the agglomerated particles also contain from 1 to 15% of a deoxidizer of the class consisting of aluminum, magnesium, silicon, manganese and chromium.

References Cited in the file of this patent

UNITED STATES PATENTS

| | | |
|---|---|---|
| 2,031,494 | Lemmerman | Feb. 18, 1936 |
| 2,220,954 | Chapman | Nov. 12, 1940 |
| 2,269,167 | Somerville | Jan. 6, 1942 |
| 2,282,175 | Emerson | May 5, 1942 |
| 2,474,787 | Landis et al. | June 28, 1949 |
| 2,544,334 | Linnert | Mar. 6, 1951 |

FOREIGN PATENTS

| | | |
|---|---|---|
| 165,312 | Austria | Feb. 10, 1950 |
| 524,020 | Canada | Apr. 17, 1956 |
| 691,527 | Great Britain | May 13, 1953 |